United States Patent [19]

Rivin

[11] Patent Number: 5,322,304
[45] Date of Patent: Jun. 21, 1994

[54] TOOL HOLDER-SPINDLE CONNECTION

[75] Inventor: Evgeny I. Rivin, Southfield, Mich.

[73] Assignee: Wayne State University, Detroit, Mich.

[21] Appl. No.: 46,957

[22] Filed: Apr. 15, 1993

[51] Int. Cl.⁵ .......................... B23B 31/117
[52] U.S. Cl. .................... 279/103; 409/234
[58] Field of Search ............. 279/9.1, 102, 103, 158; 408/239 R, 239 A, 240, 238; 409/232, 234

[56] References Cited

U.S. PATENT DOCUMENTS

| | | | |
|---|---|---|---|
| 4,621,960 | 11/1986 | Töllner | 279/102 X |
| 4,714,389 | 12/1987 | Johne | 279/158 X |
| 4,726,721 | 2/1988 | Heel et al. | 409/233 |
| 4,840,520 | 6/1989 | Pfalzgraf | 409/232 |
| 5,201,621 | 4/1993 | McMurtry et al. | 408/239 R X |

FOREIGN PATENT DOCUMENTS

| | | | |
|---|---|---|---|
| 63-245358 | of 1988 | Japan. | |
| 390877 | 1/1974 | U.S.S.R. | 279/103 |
| 403514 | 3/1974 | U.S.S.R. | 409/232 |

OTHER PUBLICATIONS

"Trends in Tooling for CNC Machine Tools: Tool-Spindle Interfaces", Manufacturing Review, vol. 4, No. 4, Dec. 1991, Eugene I. Rivin.

Primary Examiner—Steven C. Bishop
Attorney, Agent, or Firm—Krass & Young

[57] ABSTRACT

A tool holder assembly for connecting a tool to a spindle. The tool holder assembly defines a conical envelope for seating in a conical seat defined by the spindle and an annular clamping surface in surrounding relation to the conical envelope for seating against an annular clamping surface defined by the spindle. The conical envelope is resilient so as to allow simultaneous seating of the conical envelope in the conical seat of the spindle and seating of the clamping surface on the clamping seat of the spindle irrespective of the tolerances between the conical seat and the clamping seat. Several embodiments are disclosed for providing the resiliency to the conical envelope.

24 Claims, 6 Drawing Sheets

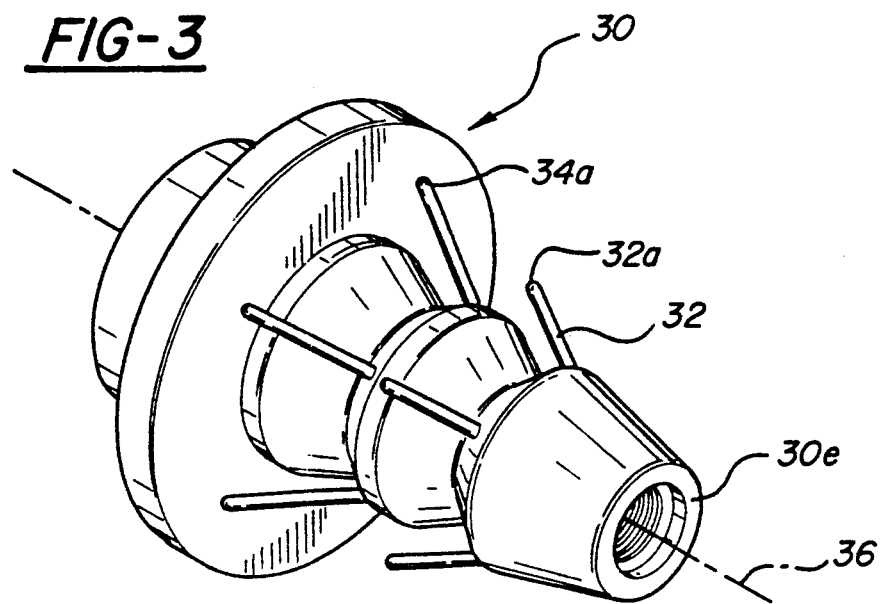
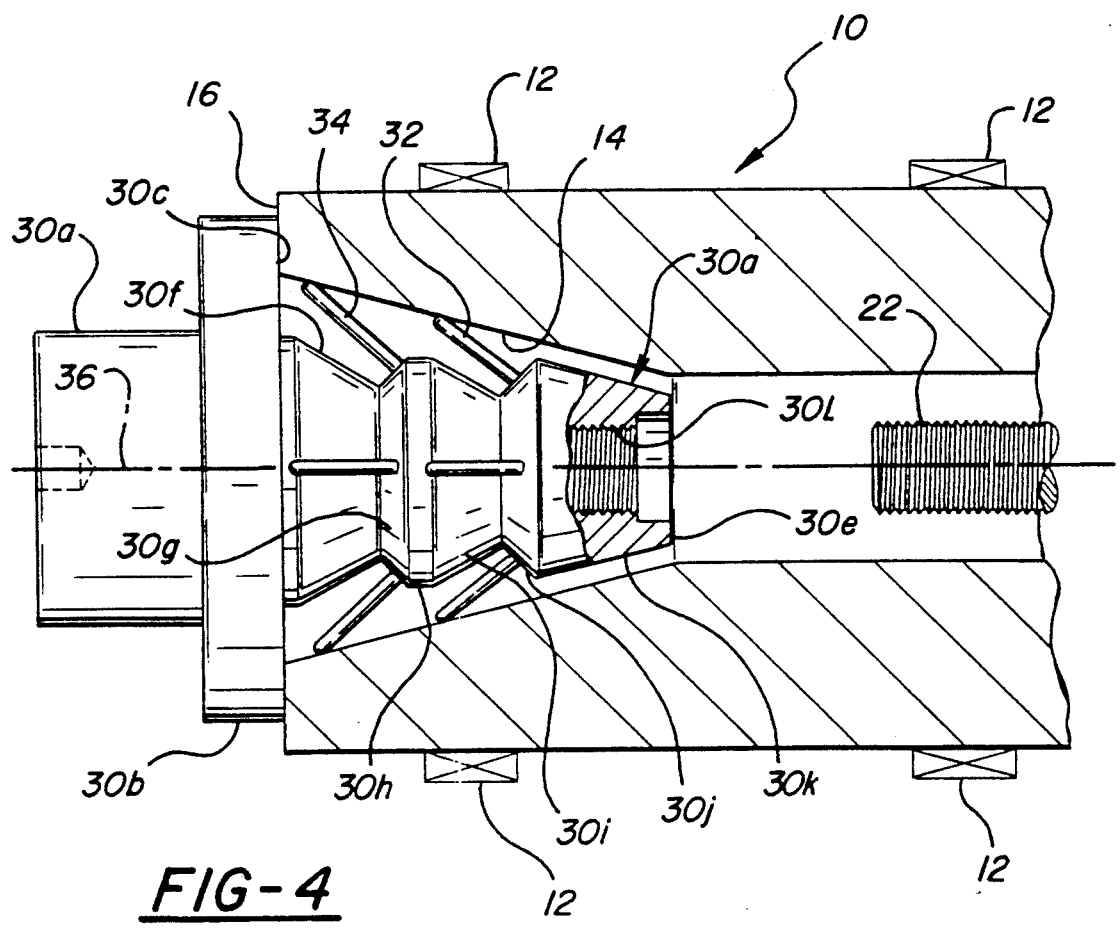

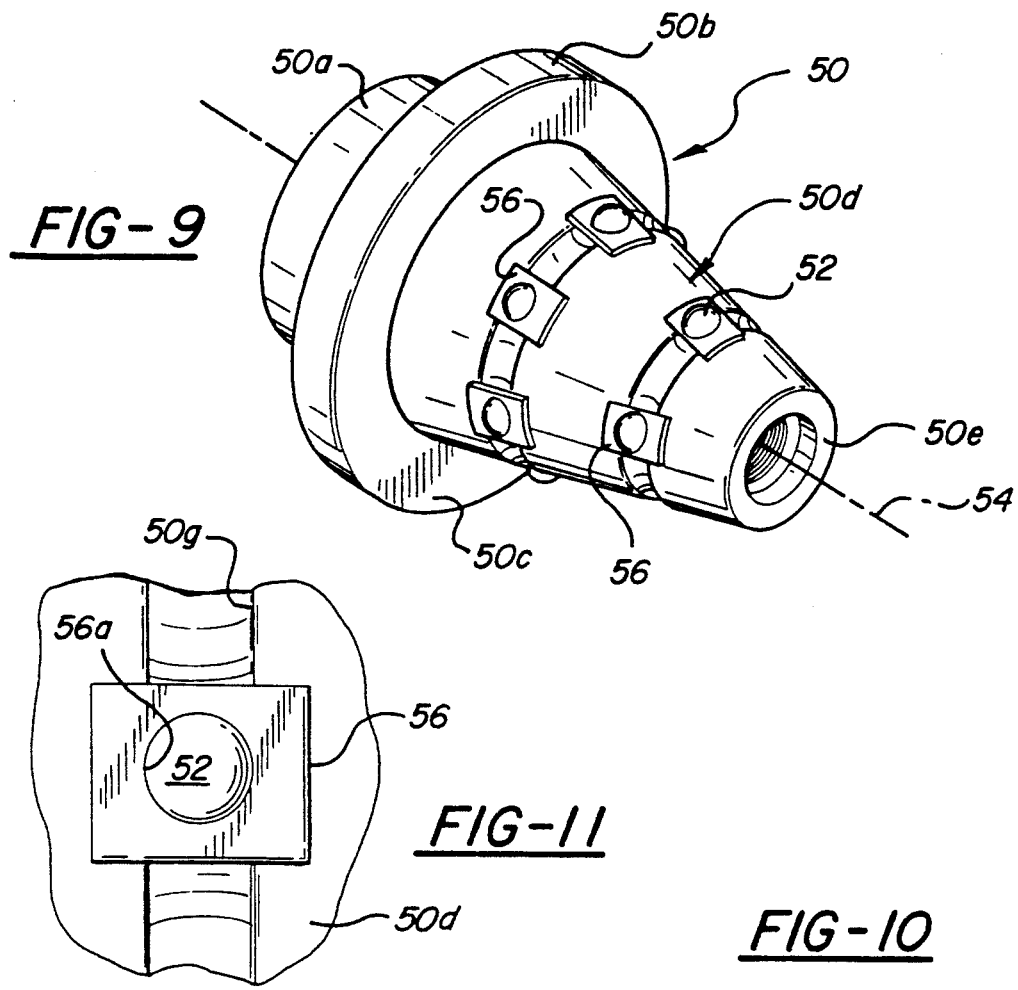
FIG-9
FIG-11
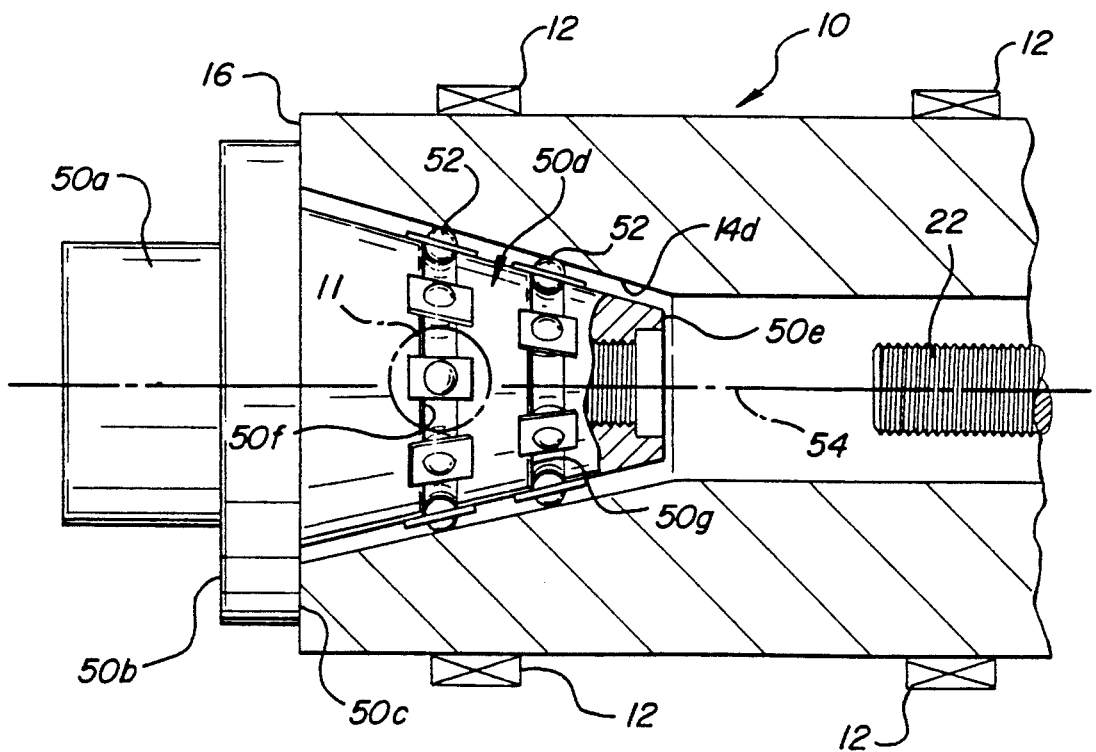
FIG-10

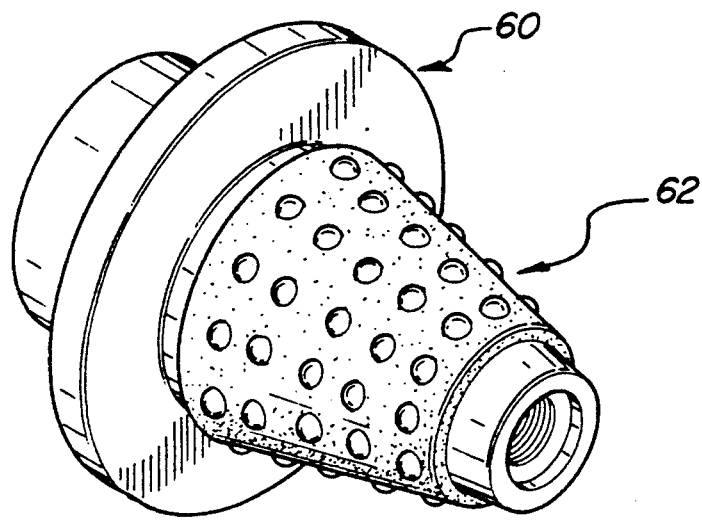
FIG-12
FIG-13
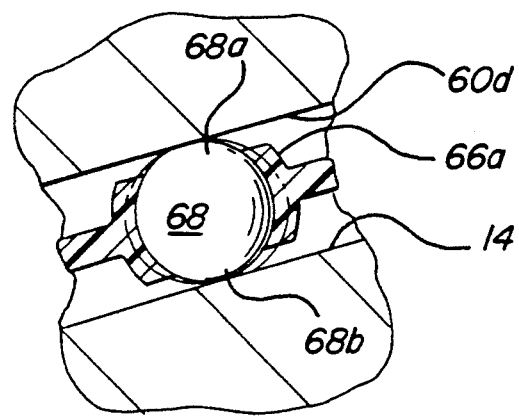
FIG-14

TOOL HOLDER-SPINDLE CONNECTION

The invention of this application was supported in part by Grant No. DDM-9005654 awarded by the National Science Foundation. The United States government may have certain rights in this application.

BACKGROUND OF THE INVENTION

This invention relates to tool holders and more specifically to an improved arrangement for mounting a tool holder in a spindle.

Tool holders are typically secured to spindles by positioning a conical shank on the tool holder in a conical opening or seat defined by the spindle. The tool holders also typically include a flange or a collar defining an annular seat which confronts an annular seat on the spindle surrounding the conical seat in the spindle. Since it is practically impossible to make interchangeable conical shanks that allow a fit both on the conical seat of the spindle and against the annular seat defined on the spindle in surrounding relation to the conical seat, it has been standard practice to specify a guaranteed clearance between the annular collar face and the annular spindle face so that the attachment stiffness between the spindle and the tool holder depends solely on the conical interconnection.

Although it is possible to machine the tool holder and spindle with high precision to achieve interface at the conical interconnection as well as at the flat annular seat for a given spindle and tool holder, it is virtually impossible to maintain the tolerances between the various interfaces to a degree such that it would be possible to interchange tool holders and spindles and yet retain positive interface at both the conical seat interface and the annular seat interface. In the absence of face contact, the stiffness depends totally on the tapered or conical interface. When the tapered seat in the spindle begins to wear out, effectively increasing the taper angle, the stiffness of the connection is drastically diminished. Stiffness is also drastically reduced when the mouth of the spindle hole expands during high rpm operation. Various attempts have been made to provide compliance between the conical shank and the conical seat of the spindle so as to allow the tool holder to seat in the spindle with positive interface at the conical shank as well as at the annular seat. These prior art compliant designs have several disadvantages. Specifically, the compliant designs are much more complex and thus much more expensive; since the taper and the holding portion are connected with a fit and are not solid, accuracy is reduced; and each clamping event involves some relative motions between the parts, thus allowing wear gradually to develop leading to further deterioration in accuracy.

SUMMARY OF THE INVENTION

This invention is directed to the provision of an improved connection between spindles and tool holders.

More specifically, this invention is directed to the provision of a simple and inexpensive spindle-tool holder connection which allows positive interfacing at both the conical interface and the annular clamping interface.

The invention tool holder defines a conical envelope for seating in a conical seat defined by a spindle and an annular clamping surface in surrounding relation to the conical envelope for seating against an annular clamping seat defined by the spindle in surrounding relation to the conical seat.

According to the invention, the conical envelope is resilient so as to allow simultaneous seating of the conical envelope in the conical seat and seating of the clamping surface on the clamping seat irrespective of the tolerances between the conical seat and the clamping seat. This arrangement effectively separates the two functions of interface location and clamping with the tapered hole in the spindle serving as a location surface and the flat face surface of the spindle serving as a clamping surface.

According to a further feature of the invention, the resiliency of the conical envelope is provided by a plurality of spaced, discrete, resilient surfaces. This arrangement provides a convenient means of providing the resiliency for the conical envelope and further allows each of the spaced, discrete, disconnected resilient surfaces to seek a concentric position relative to the central axis of the tool holder and spindle.

According to a further feature of the invention, the resilient surfaces comprise a plurality of axially spaced annular resilient surface profiles. The plurality of resilient surface profiles are each uniformly deformed as the tool holder shank is positioned in the conical seat of the spindle so that the deformed resilient surface profiles serve to locate the holder inside the spindle while simultaneously allowing the clamping surface on the tool holder to move into positive abutting contact with the clamping surface on the spindle.

Several embodiments of the invention tool holder are disclosed.

In one embodiment, the resilient means comprises a plurality of shells of conical, cylindrical, or other surface of revolution shape positioned on a tool holder core. The outer rims of the shells are concentric with the core and are dimensioned in such a way that when the tool holder is pulled inside the spindle, utilizing the typical draw bar, before the collar abutingly engages the spindle clamping face, the outer rims of the shells contact the conical seat in the spindle and each of them is uniformly deformed. Preferably the shells are fitted on the core in a shrink-fitting operation to assure the highest concentricity. Since the shells are concentric with the core, the uniformly deformed rims will precisely locate the tool holder inside the spindle while allowing the tool holder to be pressed to the spindle face due to deformation of the shells.

In another embodiment, the tool holder core includes tapered surfaces and a row of circumferentially spaced pins is mounted on each tapered surface. The pins are uniformly distributed around the circumference of the associated tapered surface and are directed approximately normally to the tapered surface. The pin lengths are chosen such that their ends contact the spindle conical seat before the clamping face contacts the spindle clamping face. Since all of the pins in one row are the same length, in the event of non-coaxial insertion of the tool holder in the spindle, the pins are unevenly deformed and this uneven deformation creates unbalance forces which act to accurately and concentrically locate the tool holder inside the spindle seat.

In another embodiment, the tool holder includes an axial core, and the conical envelope is defined by a plurality of axially spaced annular rows of balls supported by resilient collars coaxially attached to the core. The balls are positioned n such a way that all of the balls are acting against the conical seat of the spindle before the clamping surface of the tool holder contacts the clamping surface of the spindle. Since the contact points of all of the balls in one row are the same radial distance from the tool holder axis, asymmetrical location of the tool holder in the spindle results in uneven deformation of the structures supporting the balls and the ensuing unbalance forces act to restore the precise concentricity of the tool holder and the spindle.

In a further embodiment, the conical shank of the tool holder includes a plurality of annular grooves at axially spaced locations and a plurality of resilient balls are positioned at circumferentially spaced locations in each annular groove. The conical shank and balls are dimensioned such that the balls each contact the conical seat of the spindle before the clamping surface on the tool holder engages the clamping surface on the spindle with further movement of the tool holder into the conical seat of the spindle under the urging of the draw bar resulting in concentric positioning of the tool holder within the conical seat and firm clamping of the tool holder clamping surface against the spindle clamping surface.

In a further embodiment, the tool holder includes a conical cage positioned over the conical shank of the tool holder and defining a plurality of spaced sockets with each socket receiving a ball. The conical shank, the cage, and the balls are dimensioned such that the balls each contact the conical seat of the spindle before the clamping surface on the tool holder engages the clamping surface on the spindle with further movement of the tool holder into the conical seat of the spindle under the urging of the draw bar resulting in concentric positioning of the tool holder within the conical seat and firm clamping of the tool holder clamping surface against the spindle clamping surface.

In a further embodiment, the balls are mounted on the conical shank of the tool holder as a series of string assemblies with each assembly including a string passing through a central aperture in a plurality of balls and with the individual string assemblies maintained in axially spaced position on the conical shank by a series of O-rings with an O-ring positioned between each adjacent pair of string assemblies.

BRIEF DESCRIPTION OF THE DRAWING

FIG. 3 is a perspective view of a second embodiment of the invention tool holder;

FIG. 4 is a cross-sectional view showing the tool holder of FIG. 3 positioned in the conical seat of a spindle;

FIG. 7 is an enlarged detail view taken within the circle 7 of FIG. 6;

FIG. 8 is a detail view showing a modification of the embodiment of FIGS. 5-7;

FIG. 9 is a perspective view of a fourth embodiment of the invention tool holder;

FIG. 10 is a cross-sectional view showing the tool holder of FIG. 9 positioned in the conical seat of a spindle;

FIG. 11 is a detail view taken within the circle 11 of FIG. 10;

FIG. 12 is a perspective view of a fifth embodiment of the invention tool holder;

FIG. 13 is a cross sectional view showing the tool holder of FIG. 12 positioned in the conical seat of a spindle;

FIG. 14 is a detail view taken within the circle 14 of FIG. 13;

DETAILED DESCRIPTION OF THE PREFERRED EMBODIMENTS

Figure 1:
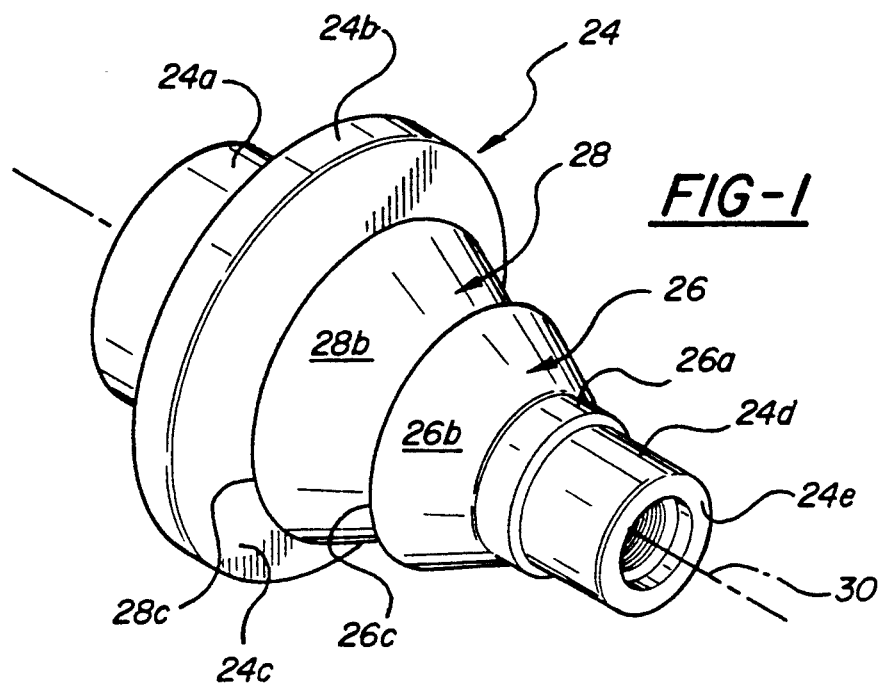
FIG. 1 is a perspective view of a first embodiment of a tool holder according to the invention.

All of the disclosed embodiments are intended to provide a simple, effective means of providing compliance as between the conical envelope of the tool holder and the clamping surface of the tool holder so that the conical envelope may seat firmly and positively within the conical seat of the spindle to accurately locate the tool holder and the clamping face may seat positively against the clamping face of the spindle to positively lock the tool holder to the spindle to provide high axial accuracy and high connection stiffness that will not be adversely affected by wearing out of the conical seat and/or by widening of the mouth of the conical seat under high speed operation.

Each of the invention tool holders is intended for use with a spindle 10 supported in known manner by bearings 12 and defining a conical seat 14, opening in the end of the spindle, and an annular end clamping surface 16 in surrounding relation to the conical seat 14. The conical seat 14 and the annular clamping surface 16 are in concentric relation to the central axis 18 of the spindle and the spindle further includes a central passage 20 communicating with the conical seat 14 and a draw bar 22 positioned in passage 20 and operative in known manner to draw a tool holder into seating engagement with the conical seat 14.

Figure 2:
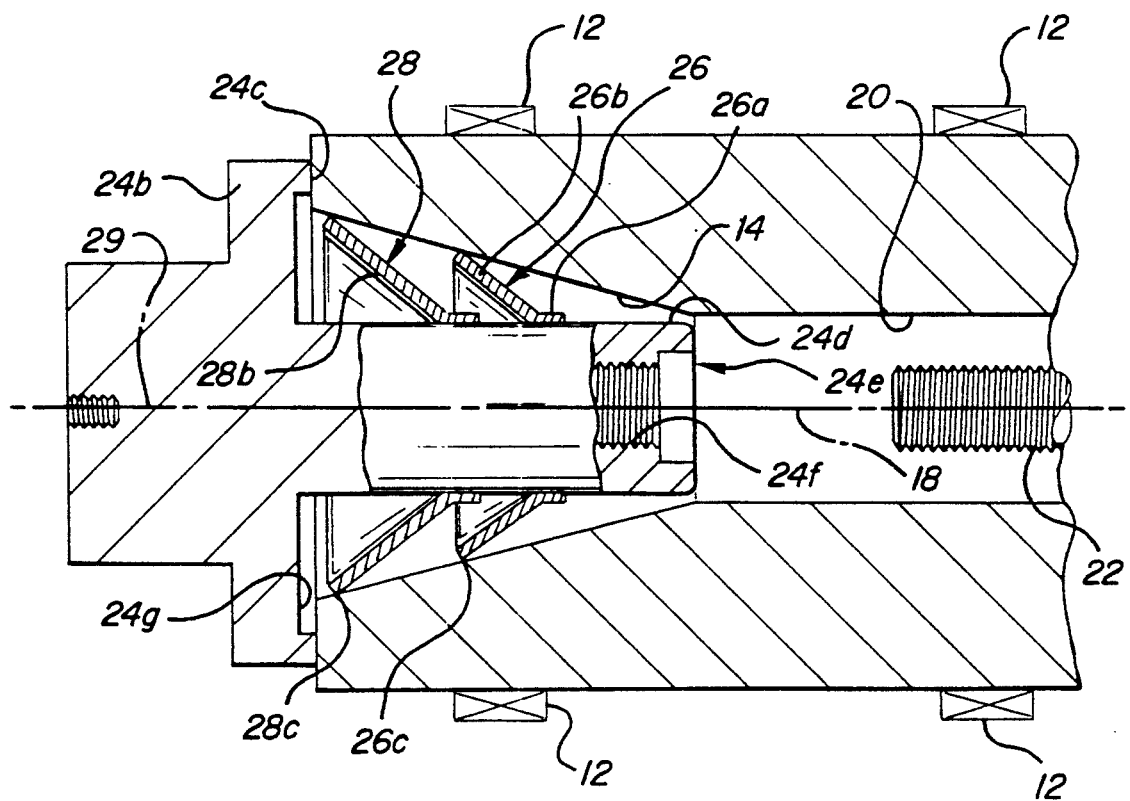
FIG. 2 is a cross-sectional view showing the tool holder of FIG. 1 positioned in the conical seat of a spindle.

The tool holder assembly seen in FIGS. 1-2 includes a tool holder body 24 and forward and rearward conical shells 28 and 26.

Tool holder body 24 is formed of a suitable ferrous material and includes a connector portion 24a at the front end of the tool holder body concentric with the central axis 30 of the tool holder, a flange portion 24b concentric with central axis 30 and defining an annular clamping face 24c, and a shank or core portion 24d concentric with central axis 30 and extending rearwardly from flange portion 24b to terminate at the rear end 24e of the tool holder body.

Connector portion 24a may be formed as an integral portion of the associated tool or may, alternatively, be connected to the associated tool utilizing known connector devices or connection techniques.

Annular clamping surface 24c on flange portion 24b is arranged to seat against the annular clamping surface 16 on the spindle when core 24d is positioned in conical seat 14. Flange portion 24b is preferably undercut or recessed as seen at 24g so as to confine the annular clamping surface 24c to the outer, maximum diameter portion of the flange, whereby to enhance stiffness of the connection for a given force applied at the draw bar 22. Further, contact surfaces 16 and 24c can be treated with a strong coating providing an increased friction coefficient, thus enhancing the torque transmitting capacity of the connection for heavy cutting requirements. For example, the coating may comprise a coating available from Salt Corporation of Hartford, Conn. as Salt Superabrasive Coating ™.

Core 24d includes a threaded bore 24f opening in the rear end 24e of the core portion and coacting with draw bar 22 in known manner to draw the tool holder body into the spindle.

Conical shells 26 and 28 are formed of a suitable metallic material and are sized to be fitted over core 24d in axially spaced relation. Rearward shell 26 includes a hub portion 26a which is preferably shrink-fitted onto the core 24d and a forwardly angled conical portion 26b defining an annular free end edge 26c.

Forward shell 28 includes a hub portion 28a shrink-fitted onto core 24d and a rearwardly angled conical portion 28b defining an annular free end edge 28c. The outer annular free end edges 26c and 28c are concentric with the central axis 29 of the tool holder body and are dimensioned such that when the tool holder body is pulled inside the spindle, and before clamping face 24c of flange 24b contacts spindle clamping face 16, the annular free end edges 26c,28c of the shells contact the conical surface of conical seat 14 and are uniformly deformed. Since the shells are concentric with the central axis of the tool holder body, the uniform deformation of the annular edges of the shells will precisely locate the tool holder with respect to the spindle central axis while yet providing sufficient resiliency to allow the annular clamping face 24c on the flange portion 24b to be pulled into firm clamping coaction with spindle clamping face 16. Radial stiffness of the shells can be easily modified by design modification of their geometry (thickness, cross-sectional shape, or angle with respect to axis 30) in order to accommodate limitations on radial deformations of the tool holder caused by gravity forces.

The tool holder assembly embodiment seen in FIGS. 3 and 4 includes a tool holder body 30 and a plurality of rearward and forward pins 32 and 34.

Tool holder body 30 is formed of a suitable ferrous material and includes a front connector portion 30a concentric with the central axis 36 of the tool holder body, a flange portion 30b concentric with central axis 36 and defining annular clamping surface 30c, and a core portion 30d extending rearwardly from flange 30b and terminating at the rear end 30e of the tool holder body.

Connector portion 30a may be formed integrally with the associated tool or may be connected to the tool in known manner.

Core portion 30d has a convoluted configuration and includes, starting with the flange portion 30b and proceeding rearwardly, an inwardly extending conical surface 30f, and outwardly extending conical surface 30g, a cylindrical surface 30h, an inwardly extending conical surface 30i, an outwardly extending conical surface 30j, and an inwardly extending conical surface 30k. Core portion 30 further includes a threaded bore 30l for threaded receipt of the draw bar 22 to draw the tool holder body into the spindle.

Rearward pins 32 are formed of a suitable resilient ferrous material and are suitably secured at their rearward ends to conical surface 30j in circumferentially spaced relation. Pins 32 preferably extend generally normal to conical surface 30j.

Similarly, forward pins 34 are formed of a suitable resilient ferrous material, are suitably secured at their rearward ends to conical surface 30g at circumferentially spaced locations, and extend generally normal to surface 30g. Rearward pins 32 thus form a rearward row of pins uniformly distributed about the central axis 36 of the tool holder body and forward pins 34 form a forward row of pins distributed uniformly about the central axis 36. The numbers, lengths and diameters of the pins may differ from row to row but the pins in a particular row are precisely identical. The pins lengths are chosen such that their free ends 32a, 34a contact the conical surface of conical seat 14 before clamping surface 30c contacts spindle clamping face 16. Since all of the pins in a given row are of the same length, any uneven pin deformation will create balancing forces which will result in an accurate (concentric) positioning of the tool holder body within conical seat 14. The provision of two or more rows of pins assures the longitudinal alignment of the tool holder body. The pin ends can be made flattened or rounded to reduce contact stresses and/or wear at the point of contact with the conical seat.

Figure 5:
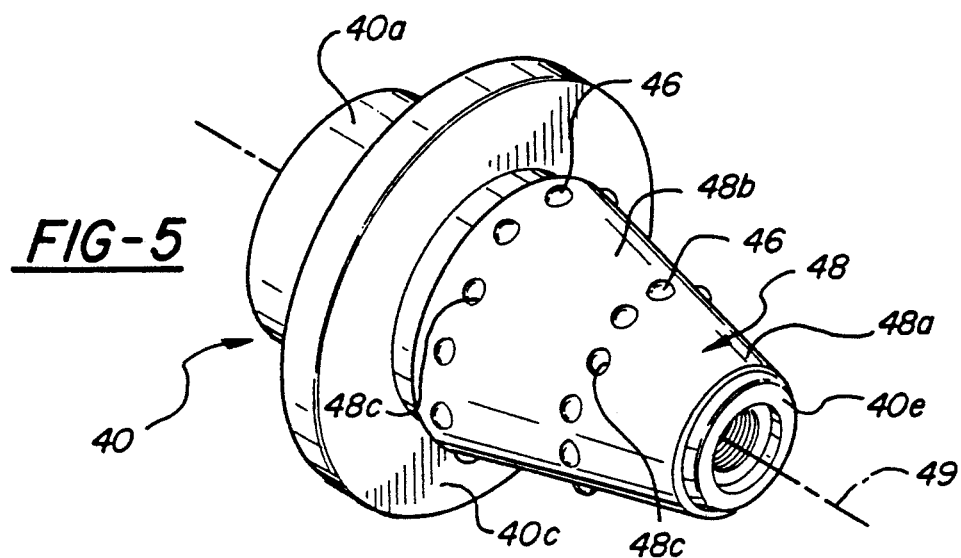
FIG. 5 is a perspective view of a third embodiment of the invention tool holder.
Figure 6:
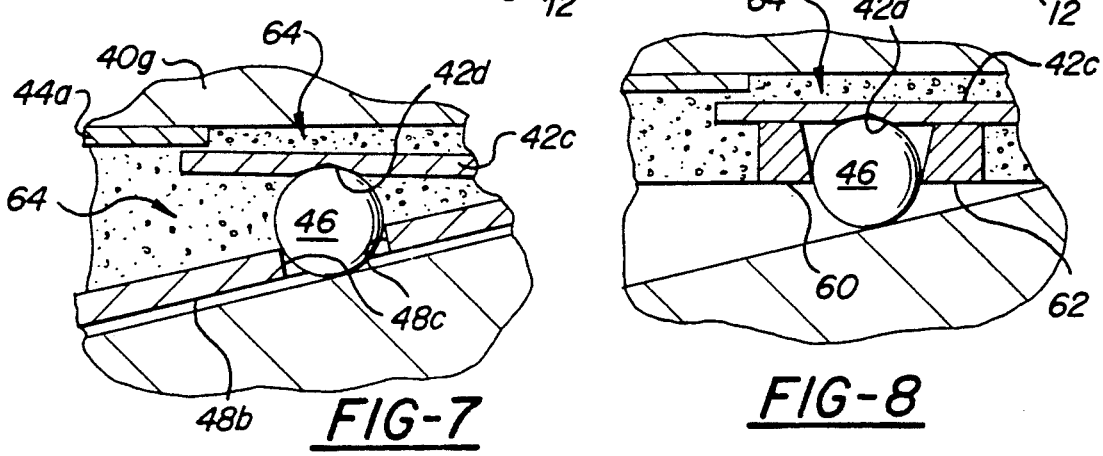
FIG. 6 is a cross-sectional view showing the tool holder of FIG. 5 positioned in the conical seat of a spindle.

The tool holder embodiment of FIGS. 5, 6, and 7 includes a tool holder body 40, rearward and forward collars 42 and 44, balls 46, and a conical cover 48.

Tool holder body 40 is formed of a suitable ferrous material and includes a front connector portion 40a flange portion 40b defining an annular clamping surface 40c for clamping coaction with spindle clamping surface 16, and a core portion 40d extending rearwardly from flange portion 40b and terminating at the rearward end 40e of the tool holder body.

Connector portion 40a may be integral with the associated tool or may be connected in known manner to the tool.

Core portion 40d is stepped downwardly in the direction of the rear end of the tool holder body and includes a cylindrical portion 40f proximate flange portion 40b, a cylindrical portion 40g connected to portion 40f by a shoulder 40h, and a cylindrical portion 40i connected to portion 40g by a shoulder 40j. A threaded bore 40k in portion 40i opens at the rear end of the core portion for threaded coaction with draw bar 22 to pull the tool holder assembly into the conical seat 14 of the spindle.

Forward collar 42 includes a hub portion 42a shrink-fitted onto core portion 40i, an annular shoulder portion 42b positioned against core shoulder 40j, and a cantilever portion 42c extending forwardly from shoulder 42b and defining a circumferential groove 42d for receipt of a plurality of circumferentially spaced steel balls 46.

Similarly, rearward collar 44 includes a hub portion 44a shrink-fitted on the core portion 40g, a shoulder portion 44b positioned against core shoulder 40h, and a cantilever portion 44c extending forwardly from shoulder 44b and defining a circumferential groove 44d for receipt of a plurality of circumferentially spaced steel balls 46.

Cover 48 is preferably formed of a suitable plastic material and includes a hub portion 48a positioned on the rearward end of core portion 40i rearwardly of the hub portion 42a of collar 42 and a hollow conical shell portion 48b conforming generally to the size and configuration of spindle conical seat 14. Two axially spaced annular rows of holes 48c are provided in shell portion 48b with each hole sized, as best seen in FIG. 7, to accommodate a ball 46 while allowing the outer periphery of the ball to project outwardly beyond the outer periphery of the shell portion.

It will be seen that the cover holes 48c operate to hold the balls 46 in place in their respective grooves 42d, 44d in the collars and further operate to maintain the balls in each row in circumferentially spaced relation. Special care must be taken in fabricating collars 42 and 44 to maintain a precise wall thickness in the cantilever portions 42c/44c so as to provide equal stiffness and thereby equal deformation under each ball in a given row of balls. The balls 46 in each row are spaced apart by approximately equal angular distances and there are at least three balls in each row. There are at least two rows of balls so that, if only one collar is utilized, the single collar would have at least two axially spaced circumferential grooves to accommodate the two rows of balls.

Collars 42/44 and balls 46 are dimensioned in such a way that all of the balls, via the holes 48c in cover 48, contact the surface of conical seat 14 before the clamping surface 40c of flange 40b contacts the spindle clamping face 16. Since the contact points of all of the balls in any given row are at the same radial distance from the tool holder axis 50, an initial asymmetrical positioning of the tool holder in the spindle would result in uneven deformation of the collar cantilever portions 42c/44c via the balls 46 and the ensuing unbalance forces would restore the precise concentricity of the tool holder with respect to the spindle. It is known that balls of near perfect sphericity are readily available in minute precision increments above and below standard normal diameters, these increments measured in about 0.0001 inches or less. Thus, any irregularities in radial and/axial positions of the balls relative to the collars can be easily corrected by an appropriate selection of ball diameters based on precision measurements.

A modification of the tool holder embodiment of FIGS. 5–7 is seen in FIG. 8 which corresponds in coverage to FIG. 7. In the FIG. 8 embodiment, the cover 48 is eliminated and each of the balls in each of the rows is held in place by circumferential bands 60 and 62 formed of high friction mildly elastic elastomeric material. The bands may be bonded or elastically attached to the cantilever portions 42c/44c and serve to maintain the balls in a respective groove 42d and in circumferentially spaced relation in the respective row of balls.

The tool holder embodiment seen in FIGS. 9–11 includes a tool holder body 50 and a plurality of balls 52.

Tool holder body 50 is formed of a suitable ferrous material and includes a front connector portion 50a concentric with the central axis 54 of the tool holder body, a flange portion 50b defining an annular clamping surface 50c for clamping coaction with spindle clamping surface 16, and a conical shank portion 50d extending rearwardly from flange portion 50b and terminating at the rearward end 50e of the tool holder body.

Connector portion 50a may be formed integrally with the associated tool or may be connected to the associated tool in known manner.

Conical shank portion 50d is sized such that, with tool holder clamping surface 50c abutting spindle clamping surface 16, an annular conical space is defined between shank portion 50d and Conical seat 14. Shank portion 50d includes a front annular groove 50f and a rear annular groove 50g with each groove extending totally around the circumference of the conical shank portion.

Balls 52 are formed of a suitable resilient material sufficiently resistant to creep and aging, such, for example, as nylon, delrin, glass or low Young's Modulus metals, and are positioned in grooves 50f and 50g in circumferentially spaced relation in the groove so as to form axially spaced rearward and forward rows of balls. As seen in FIG. 10, the balls may be retained in specific angular positions with respect to the central axis of the tool holder body by adhesive strip members 56 suitable secured to conical shank 50d in straddling relation to the respective annular groove and including a central aperture 56a through which the upper peripheral surface of the respective ball projects. The balls 52 in each annular groove have approximately equal angular spacing as measured about the central axis, there are at least three balls in each row, and there are at least two rows of balls. Conical shank 50d and balls 52 are dimensioned in such a way that all of the balls 52 contact the conical seat 14 before flange surface 50c contacts spindle clamping surface 16. Since the contact points of all of the balls in a given row are at the same radial distance from the tool holder central axis, initial asymmetrical positioning of the tool holder within the conical seat 14 would result in uneven deformation of the balls and the ensuing unbalance forces would restore the precise concentricity of the tool holder and the spindle.

The tool holder embodiment seen in FIGS. 12–14 includes a tool holder body 60 and a cage assembly 62.

Tool holder body 60 is formed of a suitable ferrous material and includes a front connector portion 60a concentric with the central axis 64 of the tool holder body, a flange portion 60b defining an annular clamping surface 60c for clamping coaction with spindle clamping surface 16, and a conical shank portion 60d extending rearwardly from flange portion 60b and terminating at the rearward end 60e of the tool holder body.

Connector portion 60a may be formed integrally with the associated tool or may be connected to the associated tool in known manner.

Conical shank portion 60d is sized such that, with tool holder clamping surface 60c abutting spindle clamping surface 16, an annular conical space is defined between shank portion 60a and conical seat 14. Shank portion 60d includes a front annular groove 60f proximate flange portion 60b and a rear annular groove 60g proximate rearward end 60e. Each groove extends totally around the circumference of the conical shank portion. The angle of inclination of the conical shaft portion 60d matches the angle of inclination of the seat 14 so that the annular conical space defined between the shank portion 60d and the conical seat 14 has a uniform thickness from front to rear of the shank portion.

Cage assembly 62 includes a conical cage or shell 66 and a plurality of balls 68.

Cage 66 may be formed of a suitable plastic or elastomeric material, has a conical configuration generally matching the conical configuration of conical shank portions 60d, and defines a plurality of sockets 68a arranged in a series of axially spaced annular rows. Cage 66 further includes a rearward lip 66b received in annular groove 60b and a forward lip 66c received in annular groove 60f. Lip 66b and 66c will be seen to coact with grooves 60f and 60g to position the cage assembly on the conical shank portion 60d in surrounding relation to the conical shank portion.

Balls 68 are sized to be respectively received in sockets 66a with the outer periphery 68a of each ball contacting conical seat 14 and the inner periphery 68b of each ball contacting shank portion 60d. Balls 68 are formed of suitable resilient material such as nylon, delrin, glass or metals.

Conical shank 60d and balls 68 are positioned and dimensioned in such a way that, as the tool holder is drawn into the conical seat by the draw bar 22, all the balls 68 contact the conical seat 14 before flange surface 60c contacts spindle clamping surface 16, whereafter further inward movement of the tool holder into conical seat 14 results in resilient deformation of the ball 68 so as to allow flange surface 60c to move into clamping engagement with spindle clamping surface 16. The resilient deformation of the balls specifically involves a slight flattening of the balls as seen in dotted lines in FIG. 14. Since the contact points of all of the balls in a given row are at the same radial distance from the tool holder central axis, initial asymmetrical positioning of the tool holder within the conical seat 14 would result in uneven deformation of the balls and the ensuing unbalanced forces would restore the precise concentricity of the tool holder and the spindle.

Figure 15:
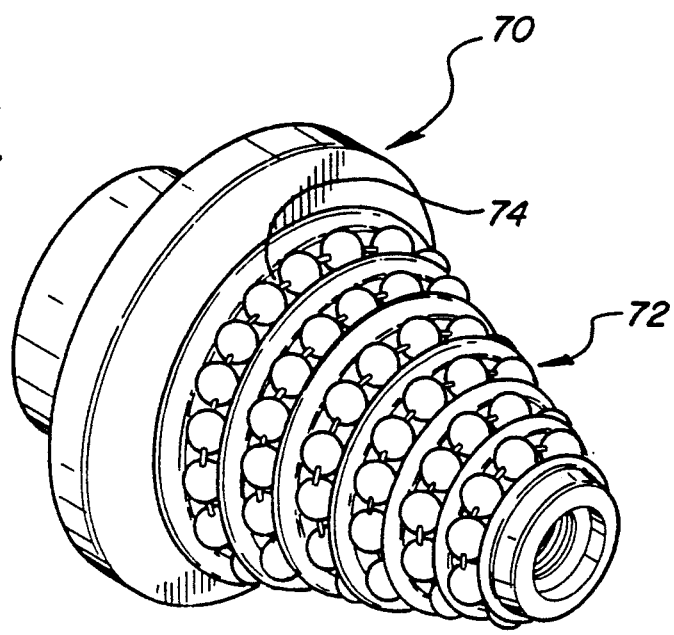
FIG. 15 is a perspective view of a sixth embodiment of the invention tool holder.
Figure 16:
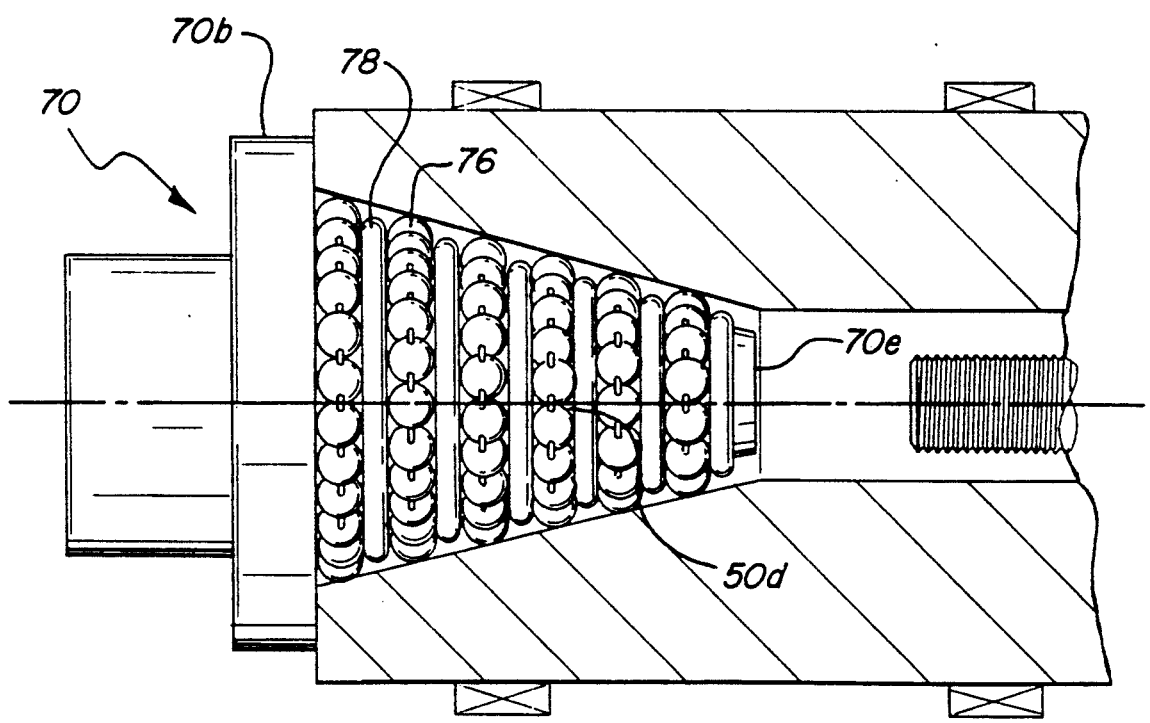
FIG. 16 is a cross sectional view showing the tool holder of FIG. 15 positioned in the conical seat of a spindle.

The tool holder embodiment seen in FIGS. 15 and 16 includes a tool holder body 70 and a plurality of string assemblies 72.

Tool holder body 70 is formed of a suitable ferrous material and includes a front connector portion 70a concentric with the central axis 74 of the tool holder body, a flange portion 70b defining an annular clamping surface 70c for clamping coaction with spindle clamping surface 16, and a conical shank portion 70d extending rearwardly from flange portion 70b and terminating at the rearward end 70e of the tool holder body.

Connector portion 70a may be formed integrally with the associated tool or may be connected to the associated tool in known manner.

Conical shank portion 70d is sized such that, with tool holder clamping surface 70c abutting spindle clamping surface 16, an annular conical space is defined between shank portion 70d and conical seat 14.

Each string assembly 72 includes a string 74 passing through central apertures in a plurality of balls 76. Balls 76 are formed of suitable resilient material such as nylon, delrin, glass or low Young's Modulus metals. The string assemblies 72 have successively smaller diameters so that they may be fitted successively on the conical shank portion 70d with the largest string assembly positioned proximate the flange portion 70b and the smallest string assembly positioned proximate the rearward end 70e of the tool holder. The individual string assemblies are maintained in axially spaced relation by a plurality of elastomeric O-rings 78 which have progressively decreasing diameters with the largest diameter O-ring positioned proximate the flange portion 70b and the smallest diameter O-ring positioned proximate the rearward end 70e of the tool.

Conical shank 70d and balls 68 are arranged and dimensioned in such a way that, as the tool holder is drawn into the conical seat 14 by draw bar 22, all of the balls contact the conical seat 14 before flange surface 70c contacts spindle clamping surface 16, whereafter, with further inward movement of the tool holder, the balls are resiliently deformed or flattened slightly to allow the flange surface 70c to move into clamping engagement with clamping surface 16. Since the contact points of all the balls in a given row are at the same radial distance from the tool holder central axis, initial asymmetrical positioning of the tool holder within the conical seat 14 would result in uneven deformation of the balls and the ensuring unbalanced forces would restore the precise concentricity of the tool holder and the spindle.

All of the embodiments can have their crevices or voids sealed or filled with a soft material 64 (see FIGS. 7 and 8, for example) such as a soft solid, or a foam elastomer. Material 64 may, as to each embodiment, be arranged to effectively fill out the voids in the conical envelope. Material 64 is preferably such as not to significantly affect the deformation characteristics of the structural resilient elements (shells, pins, collars, balls) while eliminating danger of accumulating debris around the operating elements of the tool holder with resultant modification in the tool holder performance characteristics.

Each of the disclosed embodiments of the invention tool holder will be seen to provide a simple and inexpensive design for achieving simultaneous contact for both the conical interface and the clamping interface of the spindle and tool holder, thereby ensuring that the tool holder will be precisely located with respect to the central axis of the spindle and further ensuring that the tool holder and the associated tool will be positively and stiffly held with respect to the spindle and will remain stiffly held despite wear in the conical spindle seat and despite widening of the mouth of the spindle seat occurring under high speed operating conditions.

Whereas preferred embodiments of the invention have been illustrated and described in detail it will be apparent that various changes may be made in the disclosed embodiment without departing from the scope or spirit of the invention. Further, although the invention has been illustrated and described as applied to a tool holder adapted to seat in a spindle, the invention has applicability in any situation where it is desired to connect a first member to a second member in a manner to achieve an accurate, stiff interconnection between the two members.

I claim:

1. A first member defining a conical envelope for seating in a conical seat defined by a second member and an annular clamping surface in surrounding relation to the conical envelope for seating against an annular clamping seat defined by said second member in surrounding relation to said conical seat, the conical envelope being resilient so as to allow simultaneous seating of the conical envelope in the conical seat and seating of the clamping surface on the clamping seat irrespective of the tolerances between the conical seat and the clamping seat, characterized in that the conical envelope is defined by a plurality of balls arrayed in a conical configuration and the conical envelope defined by the balls defines a conical angle matching the conical angle of the conical seat.

2. A first member according to claim 1 wherein:
the first member defines a conical core having a conical angle matching the conical angle of the conical seat and the balls are positioned on the conical core.

3. A first member defining a conical envelope for seating in a conical seat defined by a second member and an annular clamping surface in surrounding relation to the conical envelope for seating against an annular clamping seat defined by said second member in surrounding relation to said conical seat, characterized in that the conical envelope is resilient so as to allow simultaneous seating of the conical envelope in the conical seat and seating of the clamping surface on the clamping seat irrespective of the tolerances between the conical seat and the clamping seat, the resiliency of the conical envelope is provided by a plurality of spaced discrete resilient members defining spaced discrete resilient surfaces, the first member includes a central axial core and a conical shell fitted over the core, and the resilient members are positioned on the core by the shell.

4. A first member according to claim 3 wherein:
the resilient surfaces are defined by at least two axially spaced annular rows of balls resiliently supported in surrounding concentric relation to the core.

5. A tool holder defining a conical envelope for seating in a conical seat defined by a spindle and an annular clamping surface in surrounding relation to the conical envelope for seating against an annular clamping seat defined by said spindle in surrounding relation to said conical seat, the conical envelope being resilient so as to allow simultaneous seating of the conical envelope in the conical seat and seating of the clamping surface on the clamping seat irrespective of the tolerances between the conical seat and the clamping seat, characterized in that the conical envelope is defined by a plurality of balls arrayed in a conical configuration and the conical envelope defined by the balls defines a conical angle matching the conical angle of the conical seat.

6. A tool holder according to claim 5 wherein:
the tool holder defines a conical core having a conical angle matching the conical angle of the conical seat and the balls are positioned on the conical core.

7. A tool holder defining a conical envelope for seating in a conical seat defined by a spindle and an annular clamping surface in surrounding relation to the conical envelope for seating against an annular clamping seat defined by said spindle in surrounding relation to said conical seat, characterized in that the conical envelope is resilient so as to allow simultaneous seating of the conical envelope in the conical seat and seating of the clamping surface on the clamping seat irrespective of the tolerances between the conical seat and the clamping seat, the resiliency of the conical envelope is provided by a plurality of spaced, discrete, resilient members defining spaced, discrete, resilient surfaces, the tool holder includes a central axial core and a conical shell fitted over the core, and the resilient members are positioned on the core by the shell.

8. A tool holder according to claim 9 wherein:
the resilient surfaces are defined by at least two axially spaced annular rows of balls resiliently supported in surrounding concentric relation to the core.

9. A tool holder according to claim 8 wherein:
each row of balls is supported by a circular support member secured to the core and defining a cantilever annular portion including an annular groove receiving the row of balls.

10. A tool holder defining a conical envelope for seating in a conical seat defined by a spindle wherein the conical envelope is resilient and wherein the resiliency of the conical envelope is provided by a plurality of spaced, discrete, balls defining the conical envelope and arrayed substantially uniformly over the conical surface of the conical envelope.

11. A tool holder for seating in a conical seat defined by a spindle, said tool holder:
a connector portion proximate one end of the tool holder for connection to a tool;
a conical envelope proximate the other end of the tool holder defined by a plurality of spaced, discrete balls arrayed in a conical configuration with the conical envelope defined by the balls defining a conical angle matching the conical angle of the conical seat; and
means defining an annular clamping surface in surrounding relation to the conical envelope.

12. A tool holder according to claim 11 wherein:
the annular clamping surface is defined by a flange portion of the tool holder positioned between the connection portion and the conical envelope.

13. A tool holder according to claim 12 wherein:
the clamping surface is defined on the inboard face of the flange portion and the inboard face of the flange portion is cut away proximate the central region of the flange portion so that the annular clamping surface is confined to the extreme outer annular portion of the inboard face.

14. A tool holder according to claim 13 wherein:
a high friction contact coating is applied to the annular clamping surface.

15. A tool holder according to claim 9 wherein:
each row of balls is held in its respective groove by annular bands of material extending around the cantilever annular portion on each side of the balls.

16. A tool holder according to claim 10 or 11 wherein:
the tool holder further includes a soft solid or a foam material filling the voids in the conical envelope.

17. A tool holder defining a conical envelope for seating in a conical seat defined by a spindle and an annular clamping surface in surrounding relation to the conical envelope for seating against an annular clamping seat defined by said spindle in surrounding relation to said conical seat, characterized in that the conical envelope is resilient so as to allow simultaneous seating of the conical envelope in the conical seat and seating of the clamping surface on the clamping seat irrespective of the tolerances between the conical seat and the clamping seat, the resiliency of the conical envelope is provided by a plurality of spaced, discrete, resilient members defining spaced, discrete, resilient surfaces, the resilient surfaces comprise a plurality of axially spaced annular resilient surface profiles, and each annular surface profile is discontinuous and is defined by a plurality of circumferentially spaced discrete, resilient surfaces.

18. A tool holder according to claim 17 wherein:
each discrete resilient surface is defined by a ball.

19. A tool holder according to claim 18 wherein:
each ball is resiliently supported.

20. A tool holder according to claim 18 wherein:
each ball is resilient.

21. A tool holder defining a conical envelope for seating in a conical seat defined by a spindle and an annular clamping surface in surrounding relation to the conical envelope for seating against an annular clamping seat defined by said spindle in surrounding relation to said conical seat, characterized in that the conical envelope is resilient so as to allow simultaneous seating of the conical envelope in the conical seat and seating of the clamping surface on the clamping seat irrespective of the tolerances between the conical seat and the clamping seat, the tool holder includes a conical core portion, the resilient conical envelope is defined by a plurality of balls positioned in spaced relation on the conical surface of the conical core portion, and the balls are held in position on the conical surface of the conical core portion by a conical cage member positioned over the conical core portion.

22. A tool holder according to claim 21 wherein the conical core portion includes axially spaced annular grooves and the cage includes axially spaced annular lips respectively seated in the annular grooves in the conical core portion.

23. A tool holder according to claim 6 wherein: the balls are arranged in a series of annular string assemblies with each string assembly comprising a plurality of balls and a string passing through apertures in the balls.

24. A tool holder according to claim 23 wherein: the string assemblies are maintained in axially spaced position on the conical core portion by a plurality of O-rings positioned on the conical core portion with an O-ring positioned between each adjacent pair of string assemblies.

* * * * *

UNITED STATES PATENT AND TRADEMARK OFFICE
CERTIFICATE OF CORRECTION

PATENT NO. : 5,322,304
DATED : June 21, 1994
INVENTOR(S) : Evgeny I. Rivin

It is certified that error appears in the above-indentified patent and that said Letters Patent is hereby corrected as shown below:

Column 2, Line 67, delete "n" and insert --in--.

Column 5, Line 8, delete "Coating TM" and insert --Coating $^{TM}$ --.

Column 5, Line 64, delete "301" and insert --301--.
                               (NO. 1)          (letter l)

Column 6, Line 31, after "40a" insert -- centered on the central axis 49 of the tool holder body, a--.

Column 7, Line 65, delete "Conical" and insert --conical--.

Column 11, Line 48, delete "Claim 9" and insert --Claim 7--.

Column 11, Line 66, before " : " insert --including--.

Column 12, Line 27, delete "claim 10 or 11" and insert --claims 5, 10 or 11 --.

Signed and Sealed this

Fourth Day of October, 1994

Attest:

BRUCE LEHMAN

Attesting Officer      *Commissioner of Patents and Trademarks*